Oct. 4, 1955  J. J. BOYD  2,719,606
MOTOR STARTERS
Filed Jan. 10, 1952  2 Sheets-Sheet 1
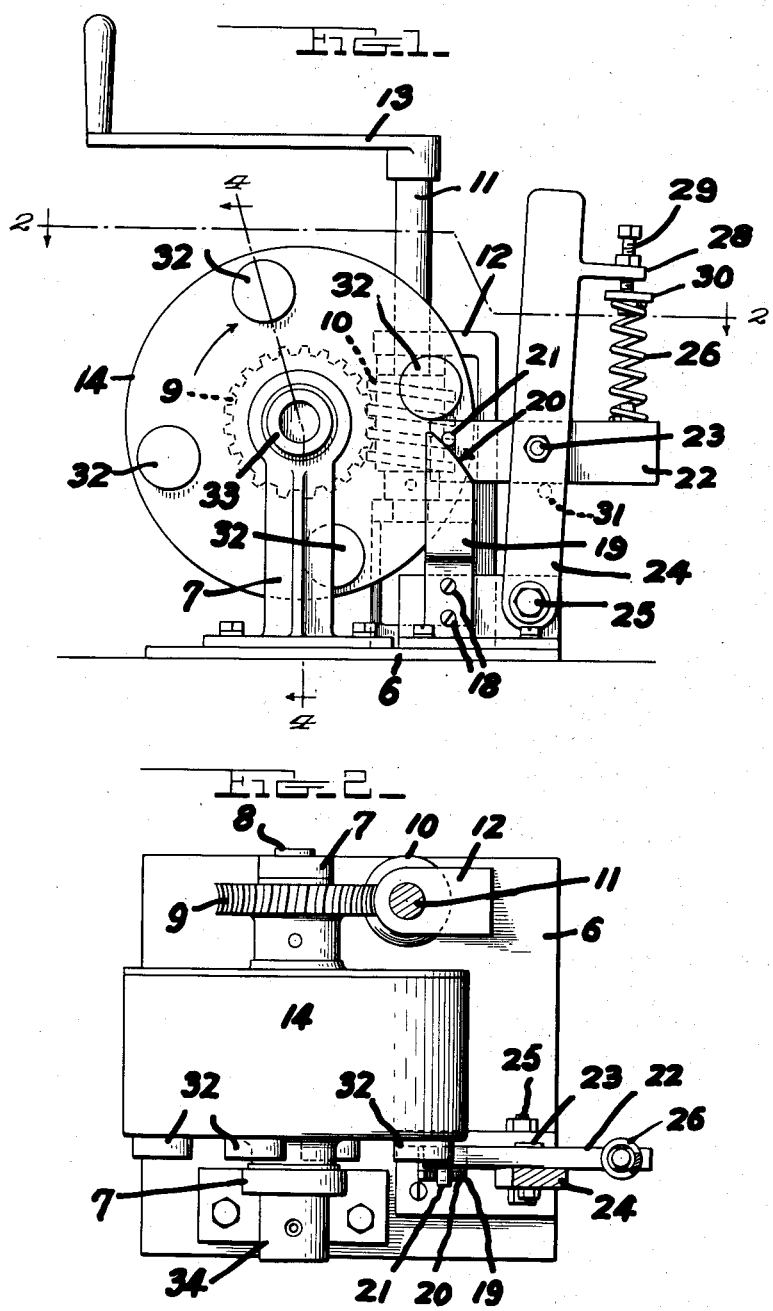
INVENTOR.
John J. Boyd
BY Dwight R. Bair
atty.

Oct. 4, 1955     J. J. BOYD     2,719,606
MOTOR STARTERS
Filed Jan. 10, 1952     2 Sheets-Sheet 2
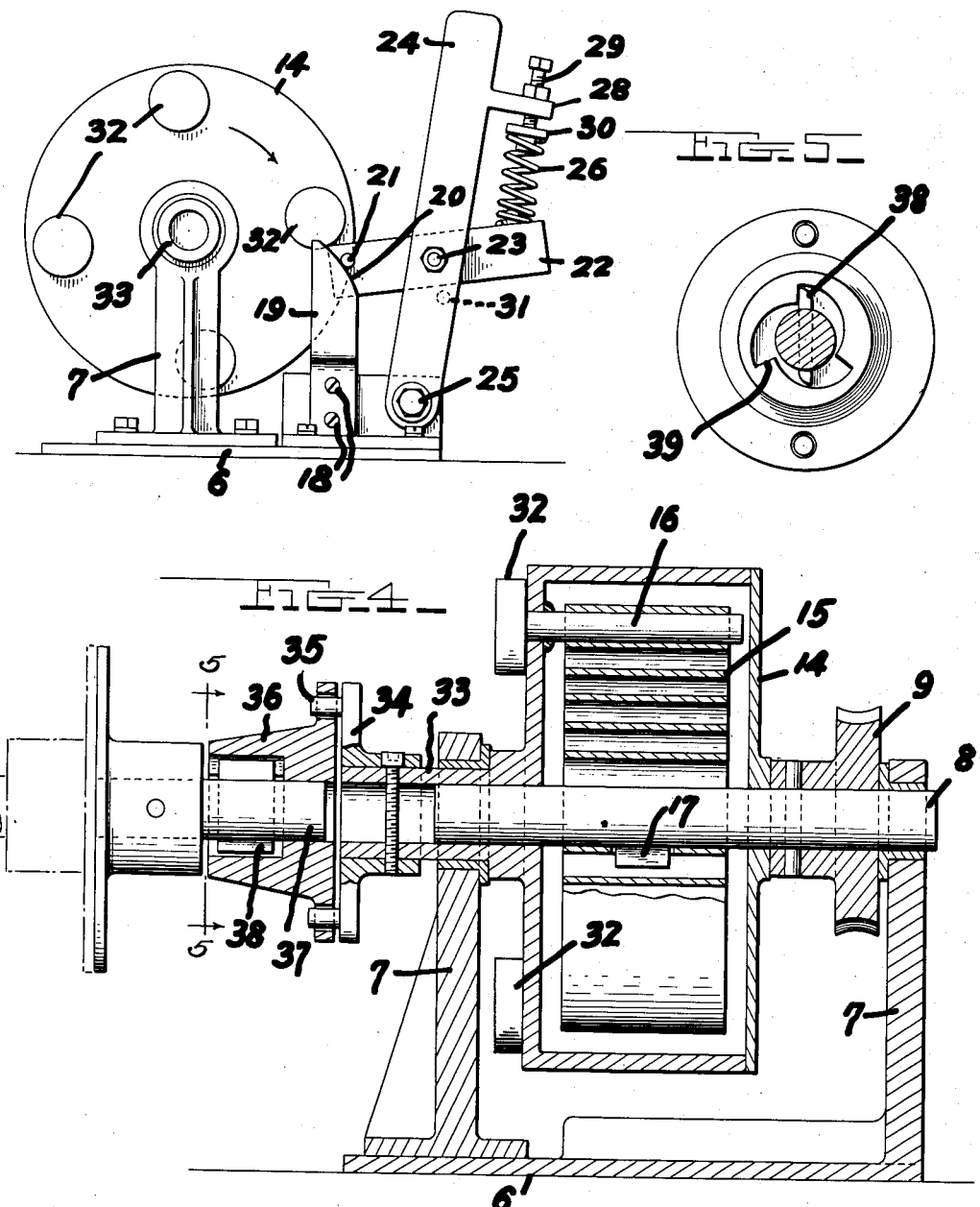
INVENTOR.
John J. Boyd United States Patent Office 2,719,606
Patented Oct. 4, 1955

2,719,606

MOTOR STARTERS

John J. Boyd, Brookmont, Md.

Application January 10, 1952, Serial No. 265,867

5 Claims. (Cl. 185—41)

This invention is a motor starter, adapted particularly for use in starting the usually low powered motors of lawn mowers, farm equipment and boat motors, aiming primarily to provide means of simplified and improved construction for bringing about the initial rotary impulse in the motor shaft to start the motor and obviating the disadvantages and annoyance incident to the use of cords or ropes heretofore employed for the same purposes.

A further object of the invention is to provide a starting device associated particularly with power driven lawn mowers requiring little effort in producing the initial rotary movement in the motor shaft, which is simple in construction, which may be easily and quickly operated by those usually unfamiliar with the actuation of such devices, which requires a minimum of effort or the exercise of strength in bringing about the starting operation, which is composed of but few simple and readily assembled parts, which parts are so constructed and arranged as to minimize the the opportunity for wear, breakage or derangement, which is positive in operation, and which will be fully effective in carrying out these several objects.

With the foregoing objects in view, together with others which will appear as the description proceeds, the invention consists in the novel construction, combination and arrangement of parts, all as will be more fully described hereinafter, illustrated in the drawings, and particularly pointed out in the claims.

In the drawings:

Fig. 1 is a side elevation of a motor starter embodying my invention, the parts being in the position they will assume at the beginning of the starting operation, Fig. 2 is a horizontal sectional view taken substantially upon the line 2—2 of Fig. 1, Fig. 3 is a view somewhat similar to Fig. 1 (parts being omitted) and showing the parts in the position they will assume at the time the spring drum is released for operation, Fig. 4 is an enlarged longitudinal sectional view taken through the starter mechanism on line 4—4 of Fig. 1, and illustrating the manner in which it is associated with the motor shaft to be started, and Fig. 5 is a sectional view taken substantially upon line 5—5 of Fig. 4.

As heretofore stated, the starter of my invention is adapted particularly for use in the starting operation of low powered motors such as are usually found upon power lawn mowers and other agricultural equipment, or for boat motors. In the present instance, the starter of my invention is shown as applied to the motor shaft of a conventional form of lawn mower motors. The starter is intended to supplant or to be substituted for the string or cord operated type of starter for lawn mower motors which have met with considerable objection. In the first place, the cord operated starter is difficult, if not impossible, to be operated by women, boys or men unfamiliar with such type of motor starters. Moreover, it is generally recognized that considerable physical exertion is required to operate the cord type starter, and frequently this exertion is beyond the capacity of women and young boys whose abilities to otherwise operate the motor mower are beyond question.

In the drawing, the supporting plate or frame for the motor is indicated at 6 and this frame is to be rigidly supported upon the lawn mower frame in close proximity to the motor shaft of the latter. Rising from the base or frame 6 are a pair of posts or bearing members 7 which support between them a starter shaft 8 having secured near one end thereof a worm gear 9 in mesh with a worm 10 carried by the worm shaft 11 disposed perpendicularly to the starter shaft 8 and supported in suitable bearings 12 carried by the base or support 6. An operating handle 13 is secured to the upper end of the shaft 11 in order that the latter may be readily rotated by hand.

Rotatably mounted upon and supported by the starter shaft 8 is a spring drum 14, within which is contained a coil spring 15, one end of which is rigidly affixed to a stud or pin 16 secured near the outer periphery of the drum 14. The opposite end of the spring 15 is permanently secured to the starter shaft 8 by means of the tongue 17 carried by the said shaft extending through a suitable opening in the coil spring 15 as shown more particularly in Fig. 4 of the drawings.

Secured at its lower end to the base or support 6 by means of screws or other fasteners 18 is a fixed post 19 spaced laterally beyond the adjacent side face of the spring drum 14 and near the outer edge thereof. The upper end of this fixed post 19 is provided with a cam face 20 to be engaged by a pin or stud 21 secured at its inner end to the inner extremity of a trigger member 22 pivoted intermediate its ends as at 23 to an upstanding swinging post 24 pivoted near its lower end as at 25 to a suitable support carried by the base member 6. An expansion spring 26 is interposed between the outer extremity of the trigger arm 22 and a lug 28 projecting rearwardly from the swinging post 24 near its upper end. The lug 28 has threaded therethrough an adjusting screw 29 which carries at its lower end a plate 30 against which the upper end of the expansion spring 26 engages. The tendency of the spring 26 is to raise the inner end of the trigger arm 22, but this movement is limited by a stop 31 secured to the swinging post 24 as shown in the drawings.

The side of the spring drum 14 adjacent to the trigger mechanism is provided with outwardly extending bosses or studs 32, the latter extending beyond the face of the drum side sufficiently far to engage the inner end of the trigger arm 22 when the latter is moved to its inner limit, but upon retraction or outward swinging movement of the pivoted post 24 the inner end of the trigger arm 22 will pass from beneath the adjacent stud 32 releasing the drum.

Referring to Fig. 4 of the drawing it will be observed that the drum 14 at one side is provided with an integral sleeve 33 to which is rigidly secured a clutch plate 34 connected by the pins 35 with a conventional overrunning clutch head 36 which receives the adjacent end of the motor shaft 37. This shaft is provided with a lateral bore through which extends the slidable key 38 as a part of the overrunning clutch mechanism. The construction is such that upon rotation of the drum in one direction, the shoulders 39 in the clutch head 36 will engage the flat faces of the sliding pin or key 38 and rotate the motor shaft therewith, and when the speed of the motor exceeds the speed of rotation of the clutch head 36, the sliding key 38 will break the power connection between the clutch head and the motor shaft automatically. This conventional type of clutch is disclosed merely as illustrative of one means of transmitting power from the spring drum to the motor shaft, but it will be understood that other types of overrunning clutch may be equally as well and effectively employed.

In operation, to bring about the initial desired rotary impulse to the motor shaft 37, the swinging post 24 is moved inwardly to the position shown in Fig. 1 so that the pin 21 is engaged with the inclined face 20 of the vertically disposed fixed post 19. Rotation of the handle 13 in the proper direction through the worm and worm gear 10–9 brings about rotary movement of the starter shaft 8 in clockwise direction. Inasmuch as this shaft is connected to the drum by means of the coil spring 15, rotary movement of the drum in clockwise direction will be brought about until the nearest boss or stud 32 engages the top edge of the trigger arm 22, whereupon this movement will be arrested. As the handle continues its rotation, the coil spring 15 is tightened around the shaft 17 increasing the spring tension upon the drum 14. When the tension of the coil spring 15 becomes sufficient, the pin 21 will slide down the inclined face 20 of the fixed post 19, forcing the trigger post 24 to swing outwardly upon its pivot 25 and remove the end of the trigger 22 from the path of the arrested boss 32, thus liberating the drum 14 to the action of the coil spring. This sudden release of the drum creates rotary movement of the sleeve 32, which movement is transmitted to the motor shaft 37 sufficiently to give the desired impulse to the said motor starter. The tension of expansion spring 26 determines the tension at which the spring 15 will kick off the trigger 22. This tension may be varied by the adjusting screw 29 as will be readily understood.

From the foregoing it is apparent that I have provided means of very simple construction for giving to the motor shaft the initial rotary impulse necessary for the starting of the motor. In order to operate the starter it is but necessary to move the trigger post inwardly, tension adjustments having previously been made, until the pin 21 engages the inclined face 20 of the fixed post 19, whereupon the simple act of rotating the handle 13 puts the drum 14 under sufficient tension to rotate the motor shaft when the boss 32 kicks out the trigger. While the mechanism for bringing about the desired result is extremely simple in operation, it is such as to readily withstand wear or breakage and cannot easily become disordered, and while the foregoing is a description of the invention in its simplest form, it is to be understood that variations in the mechanical construction and refinement may be resorted to without departing from the spirit of the invention as set forth in the claims.

I claim:

1. In a starter, a shaft, a rotor enclosing said shaft, a coil spring connected at its opposite ends to said rotor and shaft respectively, means whereby said shaft may be rotated to tension said spring, a stop on said rotor, a post adjacent to said rotor, a trigger having one end normally disposed in the path of travel of said stop and movable to a position out of said path, a pin on said trigger engaged with said post, and spring means normally holding said trigger in the path of said stop and the pin engaged with said post until the pressure of said coil spring exceeds the pressure of said spring means, to move said trigger out of the path of said stop.

2. In a starter, a shaft, a drum enclosing said shaft, a coil spring connected at its opposite ends to said rotor and shaft respectively, means whereby said shaft may be rotated to tension said spring, a post affixed adjacent to said drum and having an inclined face at its upper end, a stop projecting from said drum, a trigger having one end normally disposed in the path of travel of said stop, a pin on said trigger to engage the inclined face of said post, and spring means operating upon said trigger to maintain the same in the path of said stop and with the pin engaged with said inclined face until said coil spring has reached a predetermined tension.

3. In a starter, a shaft, a drum enclosing said shaft, a coil spring connected at its opposite ends to said rotor and shaft respectively, means whereby said shaft may be rotated to tension said spring, a stop projecting from said drum, a post affixed adjacent said drum with its upper end disposed adjacent to the path of movement of said stop, said upper end having an inclined surface, an arm pivoted adjacent to said drum and movable toward or away from the latter, a trigger pivoted to said arm and having one end normally disposed in the path of travel of said stop, a pin projecting laterally from said trigger end and normally engaging the said inclined face of said post, and spring means operating upon said trigger to normally maintain the end thereof in the path of said stop and with its pin engaged with said inclined face.

4. In a starter, a shaft, a drum enclosing said shaft, a coil spring connected at its opposite ends to said rotor and shaft respectively, a worm and worm gear for rotating said shaft to tension said spring, a stop projecting laterally from said drum, a post disposed adjacent to said drum and having an outwardly inclined upper face, an arm pivoted adjacent to said drum and capable of swinging toward or away from the latter, a trigger pivoted intermediate its ends to said arm and having one end disposed in the path of travel of said stop when said pivoted arm is moved a predetermined distance toward said drum, and a pin carried by said trigger and normally engaged with the inclined face of said post.

5. In a starter, a shaft, a drum enclosing said shaft, a coil spring connected at its opposite ends to said rotor and shaft respectively, a worm and worm gear for rotating said shaft to tension said coil spring, a stop projecting laterally from one side of said drum, a post adjacent to said drum and having an outwardly inclined upper face, an arm pivoted adjacent to said drum and movable toward or away from the latter, a trigger pivoted intermedite its ends to said arm and having one end disposed in the path of travel of said stop when the arm has been moved a predetermined distance toward said drum, a pin projecting laterally from said trigger to engage said inclined face, a spring carried by said arm and engaging the opposite end of said trigger to maintain the first named end of the trigger in the path of movement of said stop, means for varying the tension of said spring, and a stop on said arm to limit the movement of said trigger in one direction.

References Cited in the file of this patent

UNITED STATES PATENTS

| | | |
|---|---|---|
| 1,216,416 | Chalmers | Feb. 20, 1917 |
| 1,781,679 | Brenchlay | Nov. 18, 1930 |
| 2,023,235 | LeCount | Dec. 3, 1935 |